United States Patent
Kutsuna et al.

(10) Patent No.: US 7,482,769 B2
(45) Date of Patent: Jan. 27, 2009

(54) CONTROL APPARATUS FOR ELECTRIC MOTOR AND ABNORMALITY DETECTION METHOD FOR ELECTRIC MOTOR CONTROL

(75) Inventors: Masaki Kutsuna, Toyota (JP); Masaki Okamura, Toyota (JP); Kenji Yamada, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 127 days.

(21) Appl. No.: 11/637,120

(22) Filed: Dec. 12, 2006

(65) Prior Publication Data

US 2007/0138986 A1    Jun. 21, 2007

(30) Foreign Application Priority Data

Dec. 15, 2005   (JP) ............................. 2005-361558

(51) Int. Cl.
   *H02K 21/00*   (2006.01)
(52) U.S. Cl. ........................... 318/254; 318/139; 701/22
(58) Field of Classification Search ................ 318/139, 318/254; 701/22
   See application file for complete search history.

(56) References Cited

U.S. PATENT DOCUMENTS

| | | | |
|---|---|---|---|
| 5,832,395 A | | 11/1998 | Takeda et al. |
| 6,654,648 B2 * | | 11/2003 | Nada et al. ..................... 700/19 |
| 6,806,667 B1 | | 10/2004 | Sasaki et al. |
| 2005/0092105 A1 | | 5/2005 | Feick |
| 2006/0030979 A1 * | | 2/2006 | Kuang et al. ................... 701/22 |
| 2006/0085120 A1 * | | 4/2006 | McGee et al. ............... 701/113 |
| 2006/0111823 A1 * | | 5/2006 | Tamai .......................... 701/38 |

FOREIGN PATENT DOCUMENTS

JP    A 10-285710    10/1998

* cited by examiner

*Primary Examiner*—Anthony M Paul
(74) *Attorney, Agent, or Firm*—Oliff & Berridge, PLC

(57) ABSTRACT

A high-level ECU generates a torque command value T1 according to an output request to an electric motor. A low-level ECU calculates a torque command value T2 for correcting the original torque command value T1 according to the operational state of the electric motor and, according to a final torque command value Tf that is set by combining the torque command values T1 and T2, the electric motor is controlled. The high-level ECU receives from the low-level ECU the torque command value T2 and a motor state quantity transmitted thereto and, by a comparison between an actual torque value Tj determined from the motor state quantity and the final torque command value Tf determined with the torque command value T2 reflected thereto, abnormality in electric motor control is detected.

10 Claims, 4 Drawing Sheets

CONTROL APPARATUS FOR ELECTRIC MOTOR AND ABNORMALITY DETECTION METHOD FOR ELECTRIC MOTOR CONTROL

This nonprovisional application is based on Japanese Patent Application No. 2005-361558 filed with the Japan Patent Office on Dec. 15, 2005, the entire contents of which are hereby incorporated by reference.

BACKGROUND OF THE INVENTION

1. Field of the Invention

The present invention relates to a control apparatus for an electric motor and an abnormality detection method for electric motor control. More specifically, the invention relates to detection of abnormality in electric motor control by a control apparatus configured with a plurality of electronic control units (ECUs).

2. Description of the Background Art

In controlling an electric motor including an electric motor that is mounted on a hybrid vehicle for generating wheel driving power, it is required to control the output of the electric motor according to an operational command value. Further, when abnormality occurs in electric motor control, it is necessary to immediately detect the abnormality and take appropriate measures.

In view of this, regarding a hybrid vehicle provided with an engine and an electric motor as mechanical power sources for driving the vehicle, Japanese Patent Laying-Open No. 10-285710 (hereinafter Patent Document 1) for example discloses an abnormality detection apparatus for the hybrid vehicle that uses a torque sensor to detect abnormality of the mechanical power sources with high precision.

The abnormality detection apparatus for the hybrid vehicle disclosed in Patent Document 1 determines whether or not abnormality of the mechanical power sources occurs depending on whether or not a difference between a target torque of the vehicle driveshaft and an actual torque detected by the torque sensor is larger than a predetermined reference value. Further, in the case where there is abnormality, based on an actual throttle opening position and an actual motor current value as well as their command values, it is determined which of the engine and the motor generator has the abnormality. Thus, using the torque sensor, abnormality of the mechanical power sources can be detected with high precision and the configuration can be provided at a lower cost as compared with the case where the engine and the motor generator are provided with respective torque sensors.

As for a control apparatus for an electric motor, the control apparatus is generally configured with an electronic control unit (ECU) including a digital computer performing operations according to a predetermined program. However, because of limitations of the operation speed and the throughput, there could be the case where the configuration having a single electronic control unit for performing the overall electric motor control including the above-described abnormality detection is inefficient.

In such a case as described above, a configuration employed for the control apparatus includes separate ECUs that can communicable with each other and that are respectively used, for example, to perform actual electric-motor drive control which is required to be high-speed control and to generate an operational command value for the electric motor based on an operational request and perform abnormality detection control. For example, a plurality of ECUs may be configured in hierarchical form to efficiently configure a control apparatus for an electric motor while the throughput and the operation speed as required for each ECU are kept moderate.

Such a control apparatus generally has a control configuration in which an operational command value (typically torque command value) for the electric motor that is generated by an ECU at a higher level (hereinafter also referred to simply as high-level ECU) is transmitted to an ECU at a lower level (hereinafter also referred to simply as low-level ECU) and then the low-level ECU performs actual motor drive control.

Here, with the purpose of sophisticating the electric motor control, if it is tried to implement a control configuration with which the operational command value can additionally be corrected according to actual electric-motor operation, preferably the low-level ECU performs highly responsive processing for enhancing the effect of such correction. This control configuration adjusts both of an operational command value generated by the high-level ECU and the additional operational command value generated by the low-level ECU so as to generate an operational command value which is the final one for electric motor control.

However, in the control configuration as described above, the high-level ECU that should essentially detect abnormality in electric motor control cannot directly know the final operational command value for the electric motor control. Therefore, the accurate abnormality detection for electric motor control could be hindered.

Further, regarding a control apparatus configuration which may not particularly be hierarchical and in which respective operational command values independently generated by a plurality of ECUs are taken into consideration to set a final operational command value, it is required that one of the ECUs accurately detects abnormality.

SUMMARY OF THE INVENTION

An object of the present invention is that a control apparatus for an electric motor that is configured with a plurality of electronic control units (ECUs) is used to accurately detect abnormality in electric motor control.

In summary, the present invention is a control apparatus for an electric motor that includes a first control unit, a second control unit, a first transmission portion, a command value generation portion, a command value setting portion, an electric motor control portion, a second transmission portion, and an abnormality detection portion. The first control unit generates an operational command value for the electric motor. The second control unit is configured to allow information to be communicable between the first control unit and the second control unit and controls operation of the electric motor. The first transmission portion transmits, from the first control unit to the second control unit, the operational command value generated by the first control unit. The command value generation portion, using the second control unit, generates an operational command value separately from the operational command value generated by the first control unit. The command value setting portion, using the second control unit, combines the operational command values generated respectively by the first control unit and the second control unit to set a final operational command value for the electric motor. The electric motor control portion, using the second control unit, controls operation of the electric motor according to the final operational command value set by the command value setting portion. The second transmission portion transmits, from the second control unit to the first control unit, a state quantity of the electric motor controlled by the electric motor control portion and at least one of the operational command value and the final operational command value that are generated by the second control unit. The abnormality determination portion, using the first control unit, determines whether or not abnormality occurs in control of the electric motor by means of information transmitted by the second transmission portion.

Preferably, the second transmission portion transmits, from the second control unit to the first control unit, the state quantity of the electric motor and the operational command value generated by the second control unit. The control apparatus further includes a command value calculation portion, using the first control unit, determines the final operational command value based on the operational command value generated by the first control unit and the operational command value generated by the second control unit and transmitted by the second transmission portion. Further, the abnormality determination portion determines whether or not abnormality occurs in control of the electric motor based on the final operational command value determined by the command value calculation portion and the state quantity of the electric motor transmitted by the second transmission portion.

According to another aspect of the present invention, there is provided an abnormality detection method for electric motor control by a first control unit and a second control unit configured to allow information to be communicable between the first control unit and the second control unit. The method includes first and second command value generation steps, first and second transmission steps, a command value setting step, an electric motor control step, and an abnormality determination step.

The first command value generation step, using the first control unit, generates an operational command value for an electric motor. The first transmission step transmits, from the first control unit to the second control unit, the operational command value generated by the first control unit. The second command value generation step, using the second control unit, generates an operational command value separately from the operational command value generated by the first control unit. The command value setting step, using the second control unit, sets a final operational command value for the electric motor by combining the operational command values generated respectively by the first control unit and the second control unit. The electric motor control step, using the second control unit, controls operation of the electric motor, according to the final operational command value set by the command value setting step. The second transmission step transmits, from the second control unit to the first control unit, a state quantity of the electric motor controlled by the electric motor control step and at least one of the operational command value and the final operational command value that are generated by the second control unit. The abnormality determination step, using the first control unit, determines whether or not abnormality occurs in control of the electric motor by means of information transmitted by the second transmission step.

Preferably, the second transmission step transmits, from the second control unit to the first control unit, the state quantity of the electric motor and the operational command value generated by the second control unit. The abnormality detection method further includes a command value calculation step of determining the final operational command value with the first control unit, based on the operational command value generated by the first control unit and the operational command value generated by the second control unit and transmitted by the second transmission step. The abnormality determination step determines whether or not abnormality occurs in control of the electric motor based on the final operational command value determined by the command value calculation step and the state quantity of the electric motor transmitted by the second transmission step.

Regarding the control apparatus for the electric motor as well as the abnormality detection method for electric motor control, in the control apparatus configured with a plurality of control units, even in the case where the operational command values generated respectively by the control units are combined to determine the final operational command value, one control unit (first control unit) can be used to detect abnormality in electric motor control. Thus, without excessively improving the throughput of each control unit, the control apparatus is efficiently configured. Further, a plurality of control units can appropriately perform respective functions to correctly control the electric motor and detect abnormality in the electric motor control.

Still preferably, the control apparatus for the electric motor of the present invention further includes a command value check portion. The command value check portion, using the first control unit, determines whether or not the operational command value generated by the second control unit and transmitted by the second transmission portion is a value within a normal range. The command value calculation portion determines the final operational command value without considering the operational command value generated by the second control unit, in the case where the command value check portion determines that the operational command value generated by the second control unit is out of the normal range.

Still preferably, the abnormality detection method for electric motor control further includes a command value check step. The command value check step, using the first control unit, determines whether or not the operational command value generated by the second control unit and transmitted by the second transmission step is a value within a normal range. The command value calculation step determines the final operational command value without considering the operational command value generated by the second control unit, in the case where the command value check step determines that the operational command value generated by the second control unit is out of the normal range.

Accordingly, with the control apparatus, if the additional operational command value generated by the second control unit is set to a value out of the normal range, the operational command value generated by the first control unit is compared with a state quantity of the electric motor controlled in the state where the operational command value generated by the second control unit is additionally provided, so as to detect abnormality in electric motor control. In this way, the first control unit can detect abnormality in setting of the additional operational command value generated by the second control unit.

Preferably, the first control unit generates the operational command value based on an output request to the electric motor. The second control unit, using the command value generation portion, generates the operational command value additionally to the operational command value generated by the first control unit, based on an operational state of the electric motor.

Preferably, the first command value generation step generates the operational command value based on an output request to the electric motor. The second command value generation step generates the operational command value additionally to the operational command value generated by the first control unit, based on an operational state of the electric motor.

Accordingly, the first control unit performs basic operational command value setting according to an output request to the electric motor, while the second control unit can be used singly to quickly correct the additional operational command value according to the operational state of the electric motor. Thus, as compared with the case where only the first control unit is used to generate the operational command value, the controllability of the electric motor can be improved.

Preferably, the electric motor is mounted on a hybrid vehicle and used for generating wheel driving power. The first control unit generates the operational command value according to an output request torque for the electric motor according to a vehicle operation command for the hybrid vehicle. The second control unit, using the command value generation portion, generates the operational command value according to an additional output torque request appropriate to an operational state of the electric motor. In another aspect of the invention, the first command value generation step generates the operational command value according to an output request torque for the electric motor according to a vehicle operation command for the hybrid vehicle. The second command value generation step generates the operational command value according to an additional output torque request appropriate to an operational state of the electric motor.

Accordingly, the first control unit performs basic operational command value setting according to an output request torque for the electric motor in response to a vehicle operation command, while the second control unit can be used singly to quickly correct the additional operational command value according to the operational state of the electric motor. Thus, as compared with the case where only the first control unit is used to generate the operational command value, the hybrid vehicle can be improved in driving performance by quickly suppressing rotational variations or the like of the electric motor for generating the wheel driving power.

As seen from the above, a main advantage of the present invention is that the control apparatus for the electric motor configured with a plurality of electronic control units (ECUs) as well as electric motor control by such a control apparatus can be used to accurately detect abnormality in control.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
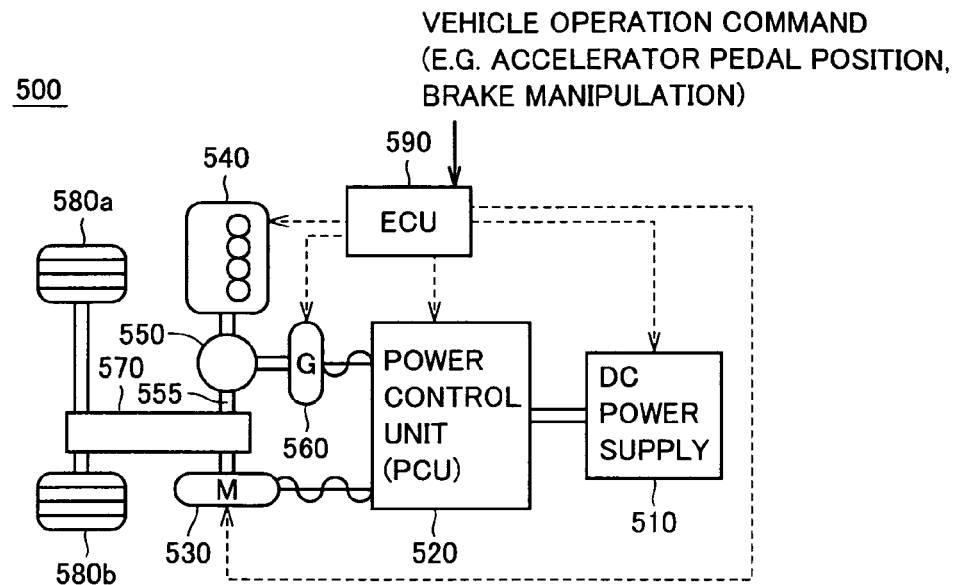
FIG. 1 is a block diagram illustrating the entire configuration of a hybrid vehicle having an electric motor mounted thereon that is controlled by an electric motor control apparatus according to an embodiment of the present invention.

In the following, embodiments of the present invention are described in detail with reference to the drawings. In the drawings, like or corresponding components are denoted by like reference characters and basically a detailed description thereof is not repeated.

First Embodiment

FIG. 1 is a block diagram illustrating the entire configuration of a hybrid vehicle having an electric motor mounted thereon that is controlled by an electric motor control apparatus according to the embodiment of the present invention.

Referring to FIG. 1, hybrid vehicle 500 includes a DC (direct current) power supply 510, a power control unit (PCU) 520 performing electric-power conversion for motor driving, an electric motor 530, an engine 540, a power split device 550, an electric generator 560, a reduction gear 570, drive wheels 580a, 580b, and a hybrid ECU 590 controlling the overall operation of hybrid vehicle 500.

While FIG. 1 shows the hybrid vehicle where only the front wheels are drive wheels, an electric motor may further be provided for driving the rear wheels to configure a four-wheel drive (4WD) hybrid vehicle.

DC power supply 510 is configured with a rechargeable secondary battery (for example nickel-hydrogen or lithium-ion secondary battery) or such an electric-energy storing device as electric double-layer capacitor. Power control unit 520 includes an inverter (not shown) for driving and controlling electric motor 530. The inverter converts a DC voltage supplied from DC power supply 510 into an AC (alternating current) voltage for driving electric motor 530. The inverter is configured to be able to make bidirectional electric-power conversion and also has the capability of converting electric power (AC voltage) generated by regenerative braking operation of electric motor 530 into a DC voltage for charging DC power supply 510. Namely, electric motor 530 may be configured to have both of the function of the electric motor and the function of the electric generator.

Further, power control unit 520 may also include a step up-and-down converter (not shown) performing level conversion of the DC voltage. Such a step up-and-down converter can be provided to drive electric motor 530 by an AC voltage having the amplitude of a higher voltage than the supply voltage of DC power supply 510, and thus the motor drive efficiency can be improved.

Engine 540 burns fuel to output driving power. Power split device 550 is coupled with engine 540, electric motor 530 and electric generator 560 and splits the mechanical power therebetween. In other words, the driving power generated by engine 540 can be split between a path for transmitting the power via reduction gear 570 to drive wheels 580a, 580b and a path for transmitting the power to electric generator 560.

As power split device 550, for example, a planetary gear system may be used that has three rotational axes for a sun gear, a planetary carrier and a ring gear. The three rotational axes are connected to respective rotational shafts of engine 540, electric motor 530 and electric generator 560. For example, electric generator 560 may be provided with a hollow rotor having its center through which the crankshaft of engine 540 is passed, so that engine 540, electric motor 530 and electric generator 560 can be mechanically connected to power split device 550. Specifically, the rotor of electric generator 560 is connected to the sun gear, the crankshaft of engine 540 is connected to the planetary carrier and an output shaft 555 is connected to the ring gear. The rotation of output shaft 555 is transmitted via reduction gear 570 to drive wheels 580a, 580b.

Thus, electric generator 560 is rotated by the driving power from engine 540 that is transmitted via power split device 550 to generate electric power. Power control unit 520 further includes another inverter (not shown) for driving and controlling generator 560. This inverter converts electric power (AC voltage) generated by generator 560 into electric power for charging DC power supply 510 or electric power used as the driving power for electric motor 530. Further, this inverter may be configured to provide bidirectional electric-power conversion and the DC voltage from DC power supply 510 may be used to allow generator 560 to operate as an electric motor for engine 540 so that engine 540 can be started. In other words, electric generator 560 may be configured to have both of the functions of the electric motor and the electric generator.

Electric motor 530 is rotated and driven by means of the AC voltage supplied from power control unit 520, and the resultant driving power is transmitted via output shaft 555 and speed reducer 570 to drive wheels 580a, 580b and used as the vehicle driving power. Further, in regenerative braking operation rotating electric motor 530 as drive wheels 580a, 580b decrease in speed, electric motor 530 serves as the electric generator.

When hybrid vehicle 500 is in a light-load state, for example, when the vehicle starts running, the vehicle is running at a low speed or descending a moderate slope, the hybrid vehicle runs with driving power from electric motor 530 without using driving power from engine 540, so as to avoid a low-efficiency region of the engine. Therefore, in this case, operation of engine 540 is stopped unless warm-up operation is necessary or electric generator 560 has to be driven to charge DC power supply 510. When such warm-up operation or charging is required, engine 540 is operated in idle state.

In a normal running state, engine 540 is started and driving power that is output from engine 540 is split by power split device 550 into the driving power of drive wheels 580a, 580b and the driving power for generating electric power by generator 560. The electric power generated by generator 560 is used to drive electric motor 530. Thus, in the normal running state, the driving power by electric motor 530 assists the driving power by engine 540 to drive the drive wheels 580a, 580b. Further, in an acceleration mode of full throttle, the electric power supplied from DC power supply 510 is further used for driving electric motor 530, so that the power for driving drive wheels 580a, 580b further increases.

Upon slowing down and braking, electric motor 530 is rotated and driven by drive wheels 580a, 580b to generate electric power. The electric power collected by regenerative power generation of electric motor 530 is converted into a DC voltage by power control unit 520, and is used for charging DC power supply 510. When the vehicle is stopped, engine 540 is automatically stopped.

As described above, hybrid vehicle 500 uses a combination of the driving power generated by engine 540 and the driving power generated by electric motor 530 from electric energy, specifically, controls the operation of engine 540 and the operation of electric motor 530 according to vehicle conditions, and thereby drives the vehicle with improved fuel efficiency. Hybrid ECU 590 controls the ratio between the driving power generated by electric motor 530 and the driving power generated by engine 540 according to vehicle conditions, based on a vehicle operation command (accelerator pedal position, brake manipulation for example).

Figure 2:
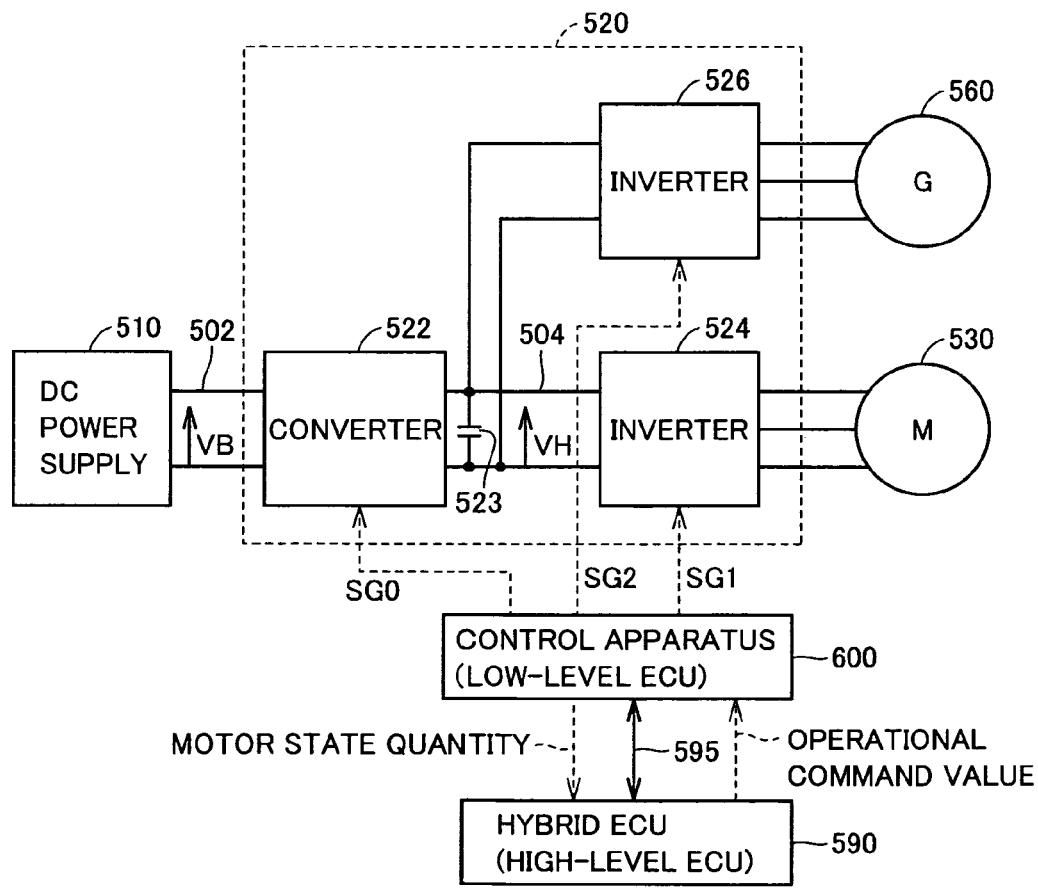
FIG. 2 is a block diagram more specifically illustrating a control configuration for the electric motor and an electric generator as shown in FIG. 1.

FIG. 2 is a block diagram illustrating in more detail the control configuration for electric motor 530 and electric generator 560 as shown in FIG. 1.

Referring to FIG. 2, rechargeable DC power supply 510 outputs a DC voltage VB to a power supply line 502. Power control unit 520 includes a converter 522, a smoothing capacitor 523 and inverters 524, 526. The operation of converter 522 and inverters 524, 526 in power control unit 520 is controlled by a control apparatus 600 provided as a low-level ECU.

Converter 522 is a step up-and-down converter capable of performing bidirectional voltage conversion that is configured to include an electric-power semiconductor switching element (not shown) such as an IGBT (Insulated Gate Bipolar Transistor), an electric-power MOS (Metal Oxide Semiconductor) transistor or an electric-power bipolar transistor. Converter 522 is switching-controlled in response to switching control signal SG0 from control apparatus 600 to step up DC voltage VB from power supply line 502 to provide a DC voltage VH to a power supply line 504. Converter 522 may also be switching-controlled in response to switching control signal SG0 to step down DC voltage VH of power supply line 504 to output DC-voltage VB to power supply line 502. The voltage conversion ratio (step-up ratio or step-down ratio) of converter 522 is variably controlled by means of switching control signal SG0.

Electric motor 530 and electric generator 560 are each configured typically with a three-phase synchronous electric motor including a stator (not shown) on which three-phase coil windings are provided and a rotor (not shown) and serving as a motor generator having both of the functions of the electric motor and the electric generator.

Inverters 524, 526 are each a general three-phase inverter configured to include at least one electric-power semiconductor switching element. Therefore, a detailed description of the configuration is not given here.

Inverter 524 is on-off controlled (switching-controlled) by an electric-power semiconductor switching element (not shown) in response to switching control signal SG1 from control apparatus 600 to convert DC voltage VH supplied from power supply line 504 into a three-phase AC voltage, and the inverter can output the three-phase AC voltage as converted to electric motor 530. Accordingly, electric motor 530 is driven and controlled to generate an output torque according to a torque command value.

Further, in regenerative braking operation of hybrid vehicle 500, electric motor 530 receives the rotational force from wheels 580a, 580b to generate a three-phase AC voltage, and inverter 524 can convert the three-phase AC voltage into a DC voltage under switching control according to switching control signal SG1 from control apparatus 600 to output the DC voltage as converted to power supply line 504. In this way, inverter 524 performs bidirectional electric power conversion for electric motor 530.

The regenerative braking here includes braking accompanied by regenerative power generation that is effected when a driver of the hybrid vehicle steps on the foot brake as well as deceleration (or stop of acceleration) of the vehicle accompanied by regenerative power generation that is effected when the driver releases the accelerator pedal without operating the foot brake.

Inverter 526 can be switching-controlled in response to switching signal SG2 from control apparatus 600 to allow electric generator 560 to generate an output torque according to a torque command value. Further, in the case where electric generator 560 is driven by engine 540 to generate electric power, inverter 526 is switching-controlled in response to switching control signal SG2 to convert a three-phase AC voltage generated by electric generator 560 into a DC voltage and output the DC voltage as converted to power supply line 504. In this way, inverter 526 performs bidirectional power conversion for electric generator 560.

Hybrid ECU 590 which is also shown in FIG. 1 is provided as a high-level ECU, and coupled with control apparatus (low-level ECU) 600 by such a communication path 595 as LAN (Local Area Network). Thus, between these ECUs 590 and 600, data, information and the like can be communicated.

Hybrid ECU 590 generates a torque command value for electric motor 530 and electric generator 560 based on a vehicle operation command (accelerator pedal position, brake manipulation for example) and according to vehicle conditions. Further, hybrid ECU 590 generates, according to the operational state of electric motor 530 and electric generator 560 that is transmitted via communication path 595, a command value for DC voltage VH so that electric motor 530 and electric generator 560 can be controlled in optimum manner. These operational command values are transmitted via communication path 595 to control apparatus 600.

Control apparatus 600 generates switching control signals SG0, SG1, SG2 so that operational control (electric motor control) of electric motor 530 and electric generator 560 can be performed according to the operational command value from hybrid ECU 590. As seen from the above, the operation of converter 522 is controlled so that DC voltage VH is generated according to the operational command value and the DC-AC voltage conversion operation by inverters 524, 526 is controlled so that electric motor 530 and electric generator 560 generate an output torque according to the operational command value.

Further, control apparatus 600 can acquire various operational state quantities of converter 522, inverters 524, 526, electric motor 530 and electric generator 560 to transmit them as required via communication path 595 to hybrid ECU 590. Hybrid ECU 590 has the capability of detecting, based on these operational state quantities, control abnormality (motor control abnormality) of power control unit 520, electric motor 530 and electric generator 560.

Figure 3:
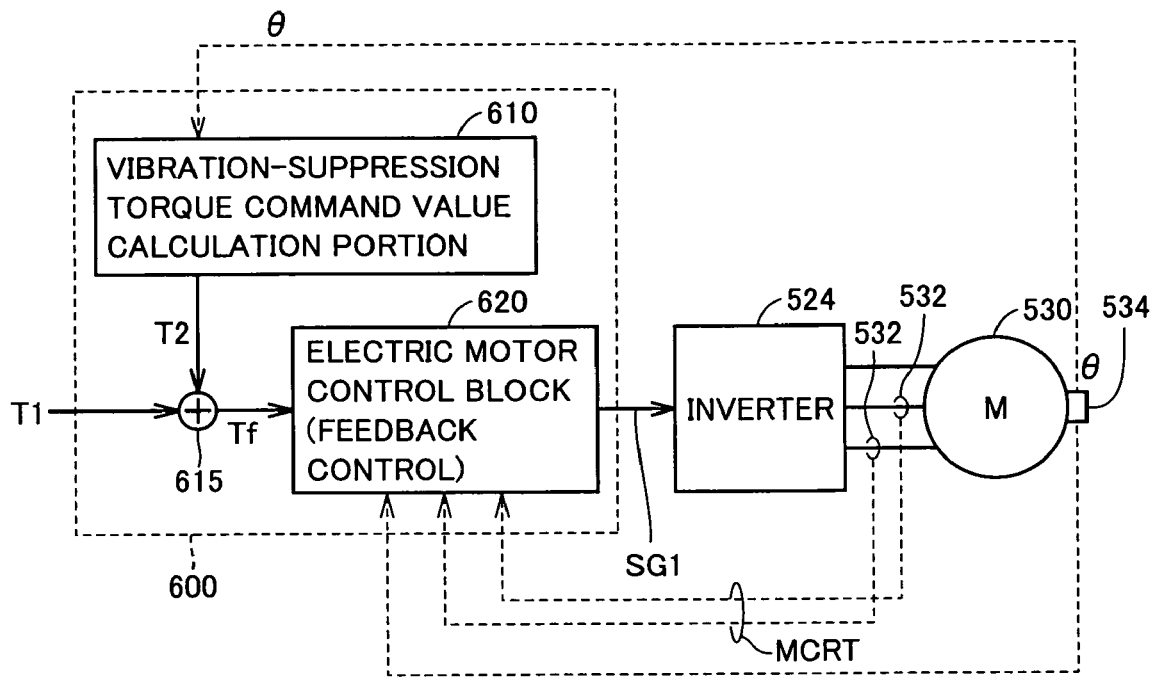
FIG. 3 is a block diagram illustrating output torque control for the electric motor.

FIG. 3 is a block diagram illustrating output torque control for electric motor 530.

Referring to FIG. 3, control apparatus 600 includes a vibration-suppression torque command value calculation portion 610, an addition point 615 and an electric motor control block 620. Vibration-suppression torque command value calculation portion 610, addition point 615 and electric motor control block 620 each correspond to a functional block implemented by control operation processing by control apparatus 600.

Electric motor 530 is provided with a current sensor 532 for detecting a motor current MCRT and a rotational position sensor 534 for detecting a motor rotational angle (electrical angle) θ. Current sensor 532 is provided for at least two phases of the three-phase lines from inverter 524 to electric motor 530. Because the sum of instantaneous values of the three-phase currents is zero, the motor currents of two phases can be detected to detect the motor current of each phase. Further, from motor rotational angle θ detected by rotational position sensor 534, a rotational speed Nm of electric motor 530 can be detected.

Electric motor control block 620 controls operation of inverter 524, based on motor current MCRT (generally representing three-phase currents Iu, Iv, Iw) detected by current sensor 532 and motor rotational angle θ, typically by feedback control of motor current MCRT or torque feedback control using an estimated torque value based on a motor state quantity. Specifically, electric motor control block 620 generates switching control signal SG1 so that AC power that allows electric motor 530 to generate an output torque according to torque command value Tf is supplied from inverter 524 to electric motor 530. In other words, inverter 524 performs DC to AC (AC to DC) electric power conversion according to switching control signal SG1 so that a motor current for generating an output torque according to final torque command value Tf is supplied from inverter 524 to electric motor 530.

Vibration-suppression torque command value calculation portion 610 calculates torque command value T2 based on an operational state at that time of electric motor 530, for example, based on an output of rotational position sensor 534, for suppressing vibrations of hybrid vehicle 500.

Figure 4:
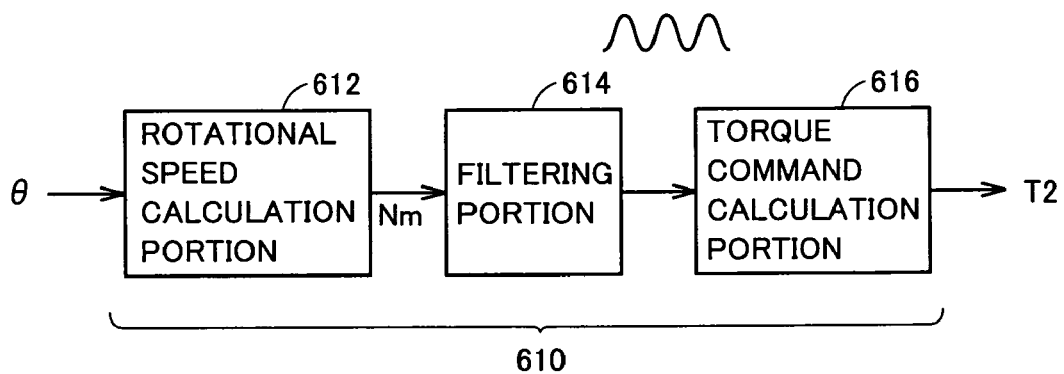
FIG. 4 is a block diagram showing an example of the configuration of a vibration-suppression torque command value calculation unit as shown in FIG. 3.

Referring to FIG. 4, vibration-suppression torque command value calculation portion 610 includes a rotational speed calculation portion 612, a filtering portion 614 and a torque command value calculation portion 616.

Rotational speed calculation portion 612 calculates rotational speed Nm based on motor rotational angle θ detected by rotational position sensor 534. This rotational speed Nm corresponds to the rotational speed of output shaft 555 (FIG. 1). Therefore, a sudden change and a periodic change of rotational speed Nm cause hybrid vehicle 500 to run unstably.

Filtering portion 614 performs filtering on rotational speed Nm determined by rotational speed calculation portion 612 to extract the sudden-change component and the periodic-change component of rotational speed Nm. Then, torque command calculation portion 616 generates vibration-suppression torque command value T2 according to an additional output torque request for canceling the sudden-change component and the periodic-change component of rotational speed Nm extracted by filtering portion 614. In other words, torque command value T2 for suppressing vibrations is a torque command of the opposite phase to the above-described sudden-change component and the periodic-change component. For the generation of vibration-suppression torque command value T2, fast processing that successively reflects the operational state of electric motor 530 is necessary. Therefore, it is highly necessary that this torque command value is generated by a low-level ECU (control apparatus 600) without data transmission to a high-level ECU (hybrid ECU 590) and processing by the high-level ECU. Namely, as compared with the case where only the high-level ECU is used to generate the torque command value, controllability of electric motor 530 can be improved.

Referring again to FIG. 3, addition point 615 sends, to electric motor control block 620, the sum of torque command value T1 from hybrid ECU 590 and vibration-suppression torque command value T2 from vibration-suppression torque command value calculation portion 610, as final torque command value Tf (Tf=T1+T2).

Thus, in the embodiment of the present invention, the electric motor control is performed through the cooperative operation by the high-level ECU (hybrid ECU 590) and the low-level ECU (control apparatus 600). In particular, regarding control of electric motor 530, hybrid ECU 590 generates the operational command value and detects control abnormality while control apparatus 600 performs operation control of electric motor 530 and makes additional correction to the operational command value according to the actual operation of electric motor 530. Then, the operational command value (torque command value T1) generated by the high-level ECU and the additional operational command value (vibration-suppression torque command value T2) generated by the low-level ECU are both adjusted to generate the final operational command value (final torque command value Tf) for the electric motor control, thereby improving controllability of the electric motor.

Figure 5:
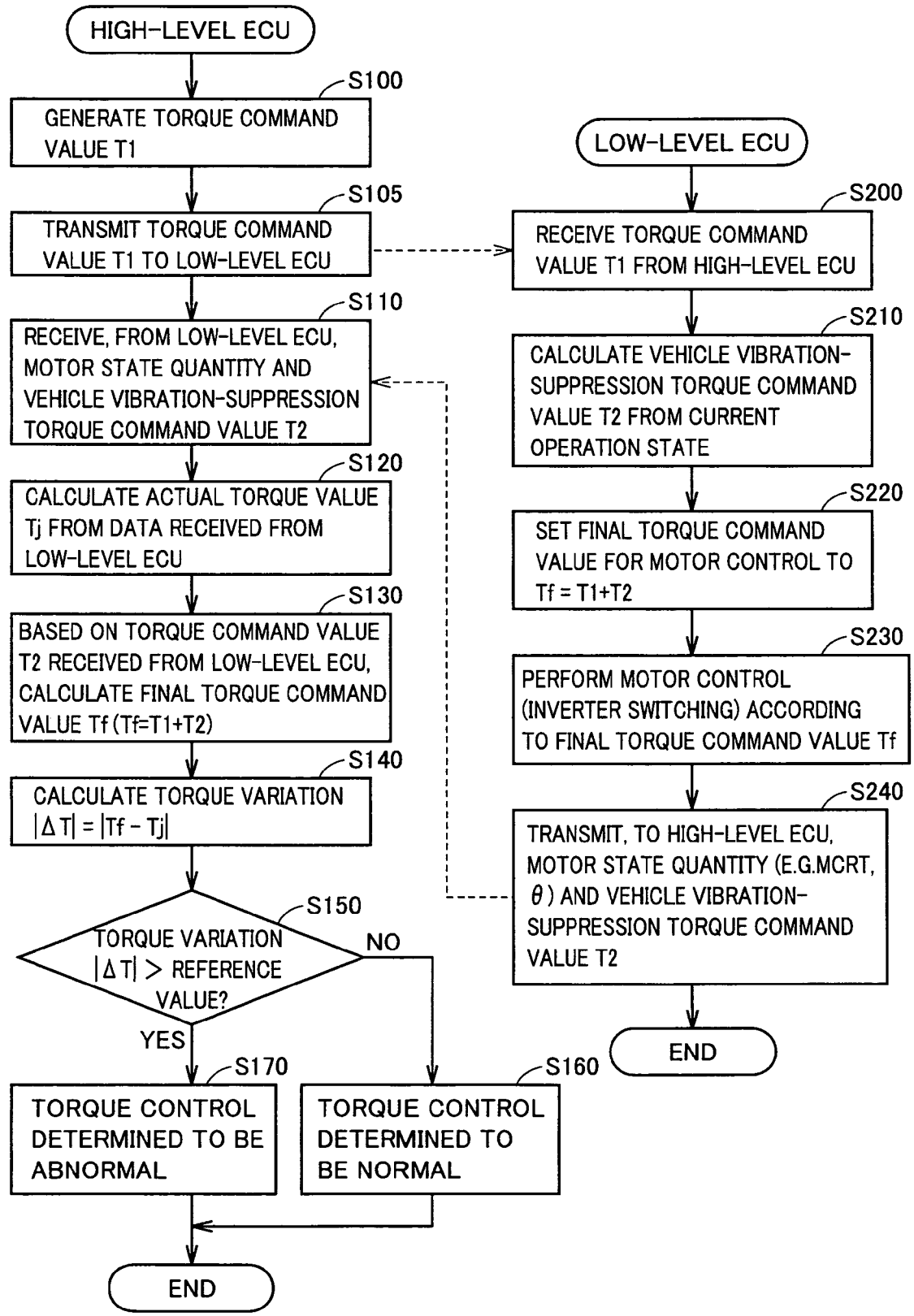
FIG. 5 is a flowchart illustrating detection of abnormality in electric motor control by a control apparatus for the electric motor according to a first embodiment of the present invention.

FIG. 5 is a flowchart illustrating detection of abnormality in electric motor control by the control apparatus for the electric motor according to the first embodiment of the present invention. As shown in FIG. 5, the control apparatus of the embodiment of the present invention configured with a plurality of ECUs combines respective processes by the high-level ECU (hybrid ECU 590) and the low-level ECU (control apparatus 600) to detect abnormality in electric motor control.

Referring to FIG. 5, in step S100, the high-level ECU controls the output ratio between electric motor 530 and engine 540 according to a vehicle operation command (typically accelerator pedal position) to generate torque command value T1 according to an output request to electric motor 530. Further, in step S105, torque command value T1 generated by the high-level ECU in step S100 is transmitted to the low-level ECU.

In step S200, the low-level ECU receives torque command value T1 from the high-level ECU. Further, in step S210, the low-level ECU calculates, from the current operational state of electric motor 530, vibration-suppression torque command value T2 by means of vibration-suppression torque command value calculation portion 610 shown in FIGS. 3 and 4.

Furthermore, in step S220, the low-level ECU sets final torque command value Tf according to the sum of torque command value T1 from the high-level ECU and vibration-suppression torque command value T2 calculated in step S210 (Tf=T1+T2). Thus, vibration-suppression torque command value T2 determined in step S210 is a torque command value for correcting the original torque command value T1 according to the operational state of electric motor 530.

In step S230, the low-level ECU performs electric motor control according to final torque command value Tf Specifically, switching operation of inverter 524 is controlled so that electric motor 530 outputs an output torque according to final torque command value Tf In addition, in step S240, the low-level ECU transmits a state quantity (typically motor current MCRT, motor rotational angle θ for example) of electric motor 530 while the electric motor is being controlled, as well as the vehicle vibration-suppression toque value T2 determined by the low-level ECU in step S210 to the high-level ECU. It is noted that, in step S240, together with vehicle vibration-suppression torque value T2 or instead of vehicle vibration-suppression torque value T2, final torque command value Tf calculated in step S230 may be transmitted from the low-level ECU to the high-level ECU.

In step S110, the high-level ECU receives the motor state quantity and vibration-suppression torque command value T2 (and/or final torque command value Tf) that are transmitted from the low-level ECU.

Further, in step S120, the high-level ECU calculates an actual torque value Tj based on the data received from the low-level ECU. For example, actual torque value Tj can be calculated by determining a d-axis current Id and a q-axis current Iq from motor current MCRT and then using expression (1).

$$Tj = Kt \cdot Iq + p \cdot (Ld-Lq) \cdot Id \cdot Iq \quad (1)$$

In expression (1), torque constant Kt as well as d-axis inductance Ld and q-axis inductance Lq are constants of electric motor 530 and p is the pole-pair number of electric motor 530. Instead of successively performing operation according to expression (1), a map may be prepared for calculating actual torque value Tj according to these motor constants and using motor currents Id, Iq as arguments.

Alternatively, using motor power Pmt determined from phase currents Iu, Iv, Iw that are motor current MCRT and from phase voltages Vu, Vv, Vw determined by the detected value of DC voltage VH and switching control signal SG2, and using rotational speed Nm namely rotational angular velocity ω, actual torque value Tj can also be calculated according to the following expression (2).

$$Tj = Pmt/\omega = (Iu \cdot Vu + Iv \cdot Vv + Iw \cdot Vw)/\omega \quad (2)$$

Further, in step S130, the high-level ECU calculates final torque command value Tf based on vibration-suppression torque command value T2 received from the low-level ECU (Tf=T1+T2). Accordingly, with the torque command value added by the low-level ECU, the high-level ECU can also obtain final torque command value Tf for actual electric motor control by the low-level ECU.

It is noted that, in step S240, in the case where the low-level ECU transmits final torque command value Tf to the high-level ECU, the above described operation may not be performed and the received final torque command value Tf may be used as it is.

Then, in step S140, the high-level ECU calculates a torque variation |ΔT|=|Tf−Tj|. Further, in step S150, the high-level ECU compares torque variation |ΔT| determined in step S140 with a reference value. In the case where torque variation |ΔT| is equal to or smaller than the reference value (determined NO in step S150), it is determined that torque control for electric motor 530 (electric motor control) is normally done (step S160). In contrast, in the case where torque variation |ΔT| exceeds the reference value (determined YES in step S150), occurrence of abnormality in torque control for electric motor 530 (electric motor control) is detected (step S170).

As seen from the above, with the abnormality detection for electric motor control according to the first embodiment, the control apparatus for the electric motor configured with a plurality of ECUs (high-level ECU and low-level ECU) can detect abnormality in electric motor control, even in the case where an operational command value (torque command value) provided by the high-level ECU is additionally corrected by the low-level ECU, by reflecting correction of the operational command value (torque command value) by the low-level ECU. In this way, without excessive enhancement of the throughput of each ECU, the control apparatus for the electric motor can efficiently be configured, while the electric motor can be controlled accurately and abnormality in the electric motor control can be detected accurately, by appropriately shared functions between a plurality of ECUs.

Here, the relation between the flowchart shown in FIG. 5 and the constituent elements of the present invention is described. Steps S105 and S200 correspond to "first transmission means" of the present invention, step S210 corresponds to "command value generation means" of the present invention, and step S220 corresponds to "command value setting means" of the present invention. Further, step S230 corresponds to "electric motor control means" of the present invention, steps S110 and S240 correspond to "second transmission means" of the present invention, step S130 corresponds to "command value calculation means" of the present invention, and steps S140 to S170 correspond to "abnormality determination means" of the present invention.

Second Embodiment

As described in connection with the first embodiment, vibration-suppression torque command value T2 is set by the low-level ECU and reflected in the electric motor control. Therefore, preferably any abnormality in setting vibration-suppression torque command value T2 by the low-level ECU due to data abnormality (such as data corruption) can be detected by the high-level ECU. A second embodiment is described regarding this type of abnormality detection.

Figure 6:
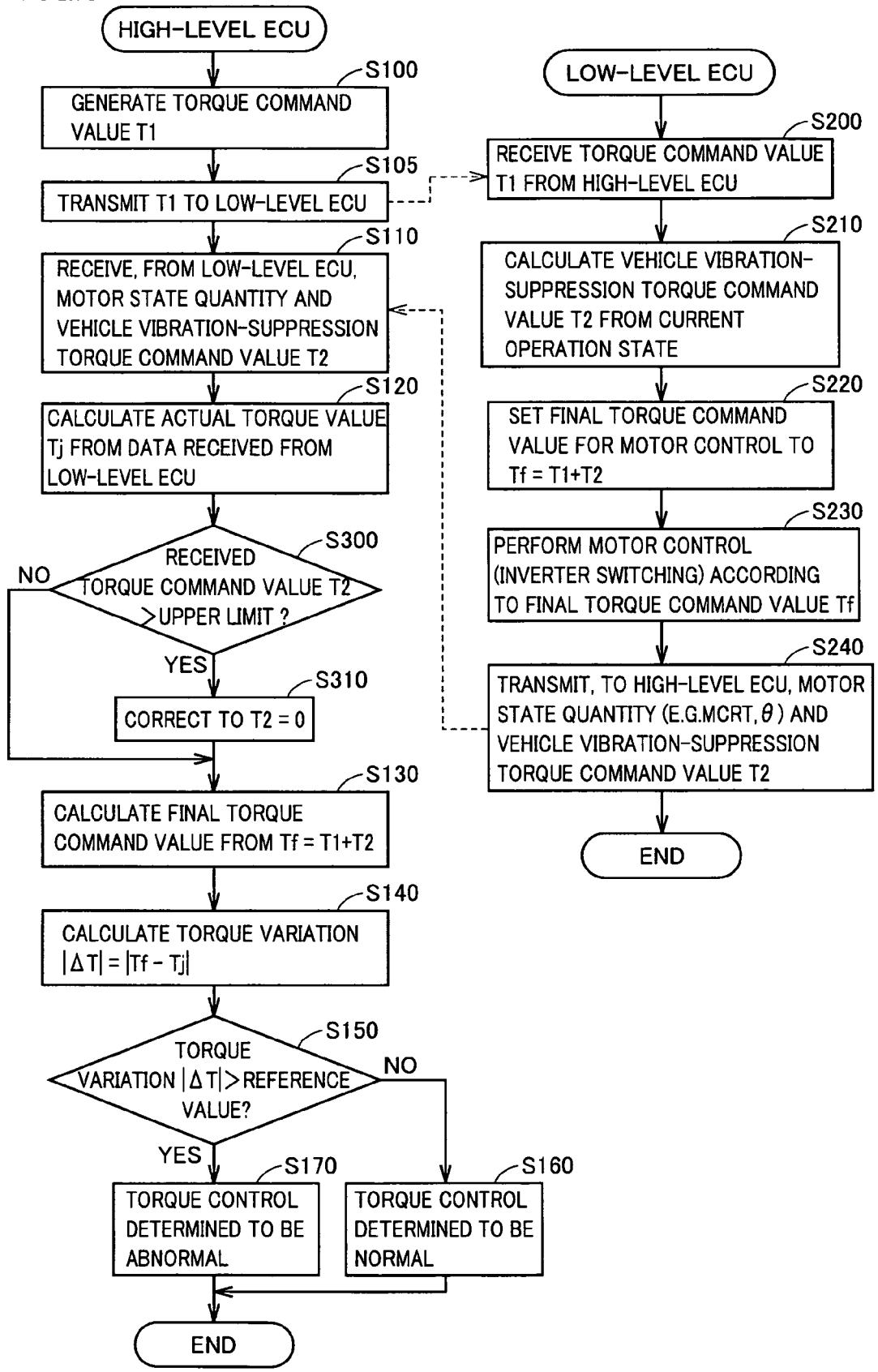
FIG. 6 is a flowchart illustrating detection of abnormality in electric motor control by a control apparatus for an electric motor according to a second embodiment of the present invention.

Referring to FIG. 6, the abnormality detection for electric motor control by a control apparatus for an electric motor according to the second embodiment differs from the abnormality detection in the first embodiment shown in FIG. 5 in that the high-level ECU performs steps S300 and S310 between steps S120 and S130. Other control steps of the flowchart shown in FIG. 6 are similar to those in FIG. 5 and the detailed description thereof is not repeated.

In step S300, the high-level ECU determines whether or not vibration-suppression torque command value T2 received from the low-level ECU is a value within a normal range. Specifically, the absolute value |T2| of the vibration-suppression torque command value is compared with an upper limit which is set according to the normal range. Then, in the case where the absolute value |T2| of the vibration-suppression torque command value received from the low-level ECU exceeds the upper limit (determined YES in step S300), the high-level ECU corrects, in step S310, vibration-suppression torque command value T2 to zero (T2=0).

In contrast, in the case where received vibration-suppression torque command value T2 is within a normal range (NO in step S300), the high-level ECU skips step S310 to perform step S130 similar to the one in FIG. 5.

Therefore, in the case where received vibration-suppression torque command value T2 is within a normal range, similar control steps to those in FIG. 5 are carried out from step S130. Then, final torque command value Tf is compared with actual torque value Tj (S120) to determine whether or not abnormality occurs in electric motor control.

In the case where data corruption for example causes vibration-suppression torque command value T2 of the low-level ECU to be set to exceed the normal range, torque command value T2 is corrected to zero (T2=0) and then the steps from step S130 are carried out to determine whether or not abnormality occurs in electric motor control. At this time, the actual electric motor control is performed in which vibration-suppression torque command value T2 set to exceed the normal range is reflected. Therefore, from an increase in torque variation |ΔT| (steps S150, S170), abnormality in setting vibration-suppression torque command value T2 by the low-level ECU can be detected as abnormality in electric motor control by the high-level ECU.

As seen from the above, the abnormality detection for electric motor control according to the second embodiment can be used to detect, by the high-level ECU, abnormality in setting the additional operational command value (vibration-suppression torque command value T2) by the low-level ECU due to data abnormality (data corruption for example).

It is noted that steps S300, S310 in FIG. 6 correspond to "command value check means" of the present invention.

While the embodiments of the present invention have been described by illustrating the control apparatus for the electric motor of the hybrid vehicle, the control apparatus for the electric motor of the present invention is applicable to an electric motor mounted on an electric car. Further, the present invention is applicable to abnormality detection for electric motor control, as long as the control apparatus for the electric motor is configured with a plurality of ECUs (or CPUs) and has the control structure adjusting operational command values generated independently by a plurality of ECUs (CPUs) to set a final operational command value, regardless of whether or not those ECUs (CPUs) are provided in a hierarchical form and without limiting the type of the electric motor to be driven and controlled as well as the devices, systems for example to be mounted.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A control apparatus for an electric motor, comprising:
   a first control unit generating an operational command value for said electric motor;
   a second control unit configured to allow information to be communicable between said first control unit and said second control unit, for controlling operation of said electric motor;
   first transmission means for transmitting, from said first control unit to said second control unit, the operational command value generated by said first control unit;
   command value generation means, using said second control unit, for generating an operational command value separately from the operational command value generated by said first control unit;
   command value setting means, using said second control unit, for combining the operational command values generated respectively by said first control unit and said second control unit to set a final operational command value for said electric motor;
   electric motor control means, using said second control unit, for controlling operation of said electric motor according to said final operational command value set by said command value setting means;
   second transmission means for transmitting, from said second control unit to said first control unit, a state quantity of said electric motor controlled by said electric motor control means and at least one of said operational command value and said final operational command value that are generated by said second control unit; and
   abnormality determination means, using said first control unit, for determining whether or not abnormality occurs in control of said electric motor by means of information transmitted by said second transmission means.

2. The control apparatus for the electric motor according to claim 1, wherein
   said second transmission means transmits, from said second control unit to said first control unit, the state quantity of said electric motor and the operational command value generated by said second control unit,
   said control apparatus further comprises a command value calculation means, using said first control unit, for determining said final operational command value based on the operational command value generated by said first control unit and the operational command value generated by said second control unit and transmitted by said second transmission means, and
   said abnormality determination means determines whether or not abnormality occurs in control of said electric motor based on said final operational command value determined by said command value calculation means and the state quantity of said electric motor transmitted by said second transmission means.

3. The control apparatus for the electric motor according to claim 2, further comprising a command value check mean, using said first control unit, for determining whether or not the operational command value generated by said second control unit and transmitted by said second transmission means is a value within a normal range, wherein
said command value calculation means determines said final operational command value without considering the operational command value generated by said second control unit, in the case where said command value check means determines that the operational command value generated by said second control unit is out of said normal range.

4. The control apparatus for the electric motor according to claim 1, wherein
said first control unit generates said operational command value based on an output request to said electric motor, and
said second control unit, using said command value generation means, generates said operational command value additionally to the operational command value generated by said first control unit, based on an operational state of said electric motor.

5. The control apparatus for the electric motor according to claim 1, wherein
said electric motor is mounted on a hybrid vehicle and used for generating wheel driving power,
said first control unit generates said operational command value according to an output request torque for said electric motor according to a vehicle operation command for said hybrid vehicle, and
said second control unit generates said operational command value with said command value generation means, according to an additional output torque request appropriate to an operational state of said electric motor.

6. An abnormality detection method for electric motor control by a first control unit and a second control unit configured to allow information to be communicable between the first control unit and the second control unit, comprising:
a first command value generation step of generating an operational command value for an electric motor with the first control unit;
a first transmission step of transmitting, from said first control unit to said second control unit, the operational command value generated by said first control unit;
a second command value generation step of generating an operational command value separately from the operational command value generated by said first control unit with said second control unit;
a command value setting step of setting a final operational command value for said electric motor with said second control unit by combining the operational command values generated respectively by said first control unit and said second control unit;
an electric motor control step of controlling operation of said electric motor according to said final operational command value set by said command value setting step, with said second control unit;
a second transmission step of transmitting, from said second control unit to said first control unit, a state quantity of said electric motor and at least one of said operational command value and said final operational command value that are generated by said second control unit; and
an abnormality determination step of determining whether or not abnormality occurs in control of said electric motor by means of information transmitted by said second transmission step, with said first control unit.

7. The abnormality detection method for electric motor control according to claim 6, wherein
said second transmission step transmits, from said second control unit to said first control unit, the state quantity of said electric motor and the operational command value generated by said second control unit,
said abnormality detection method further comprises a command value calculation step of determining said final operational command value with said first control unit, based on the operational command value generated by said first control unit and the operational command value generated by said second control unit and transmitted by said second transmission step, and
said abnormality determination step determines whether or not abnormality occurs in control of said electric motor based on said final operational command value determined by said command value calculation step and the state quantity of said electric motor transmitted by said second transmission step.

8. The abnormality detection method for electric motor control according to claim 7, further comprising a command value check step of determining whether or not the operational command value generated by said second control unit and transmitted by said second transmission step is a value within a normal range, with said first control unit, wherein
said command value calculation step determines said final operational command value without considering the operational command value generated by said second control unit, in the case where said command value check step determines that the operational command value generated by said second control unit is out of said normal range.

9. The abnormality detection method for electric motor control according to claim 6, wherein
said first command value generation step generates said operational command value based on an output request to said electric motor, and
said second command value generation step generates said operational command value additionally to the operational command value generated by said first control unit, based on an operational state of said electric motor.

10. The abnormality detection method for electric motor control according to claim 6, wherein
said electric motor is mounted on a hybrid vehicle and used for generating wheel driving power,
said first command value generation step generates said operational command value according to an output request torque for said electric motor according to a vehicle operation command for said hybrid vehicle, and
said second command value generation step generates said operational command value according to an additional output torque request appropriate to an operational state of said electric motor.

* * * * *